US011710114B2

United States Patent
Masuda

(10) Patent No.: US 11,710,114 B2
(45) Date of Patent: Jul. 25, 2023

(54) PRODUCT PURCHASE SUPPORT SYSTEM, PRODUCT PURCHASE SUPPORT DEVICE AND METHOD, POS TERMINAL DEVICE, AND NON-TRANSITORY COMPUTER READABLE MEDIUM

(71) Applicant: NEC Platforms, Ltd., Kawasaki (JP)

(72) Inventor: Reo Masuda, Kanagawa (JP)

(73) Assignee: NEC Corporation, Tokyo (JP)

( * ) Notice: Subject to any disclaimer, the term of this patent is extended or adjusted under 35 U.S.C. 154(b) by 187 days.

(21) Appl. No.: 17/285,144

(22) PCT Filed: Sep. 30, 2019

(86) PCT No.: PCT/JP2019/038509
§ 371 (c)(1),
(2) Date: Apr. 14, 2021

(87) PCT Pub. No.: WO2020/080078
PCT Pub. Date: Apr. 23, 2020

(65) Prior Publication Data
US 2021/0357896 A1    Nov. 18, 2021

(30) Foreign Application Priority Data
Oct. 16, 2018    (JP) .................................. 2018-194909

(51) Int. Cl.
*G06Q 20/20* (2012.01)
*G06T 7/215* (2017.01)
(Continued)

(52) U.S. Cl.
CPC ......... *G06Q 20/203* (2013.01); *G06Q 20/202* (2013.01); *G06T 7/215* (2017.01);
(Continued)

(58) Field of Classification Search
None
See application file for complete search history.

(56) References Cited

U.S. PATENT DOCUMENTS

2006/0032915 A1*  2/2006  Schwartz ................. G07F 7/02
                                                            235/383
2019/0104866 A1   4/2019  Kobayashi et al.
2021/0357896 A1* 11/2021  Masuda ................... G07G 1/12

FOREIGN PATENT DOCUMENTS

CN        104115172 A       10/2014
CN        106934692          7/2017
(Continued)

OTHER PUBLICATIONS

Interactive Presentation of Information for Shopping Assistance in Intelligent Space. Shiratsu.et al. (Year: 2019).*
(Continued)

*Primary Examiner* — Delomia L Gilliard

(57) ABSTRACT

Provided are a product purchase support system (100), a product purchase support device (10), and a POS terminal device (20) that improve the efficiency of checkout processing for product sales and enhance the convenience of customers when purchasing a product. The product purchase support system (100) according to the present invention includes the product purchase support device (10) including a depth camera (12) and a first display device (13), and a POS terminal device (20) that performs checkout processing for a product. When the product purchase support device (10) detects a product selection motion of selecting a product by a customer, it identifies a product selected by the customer and generates product information related to this product, and displays the product information on the first display device (13). Further, the product purchase support device (10) outputs the product information to the POS terminal device (20).

9 Claims, 17 Drawing Sheets

(51) Int. Cl.
    *G06T 7/579*     (2017.01)
    *G07G 1/00*      (2006.01)
    *G07G 1/12*      (2006.01)
    *G06V 20/52*     (2022.01)

(52) U.S. Cl.
    CPC .............. *G06T 7/579* (2017.01); *G06V 20/52* (2022.01); *G07G 1/0018* (2013.01); *G07G 1/12* (2013.01)

(56) References Cited

FOREIGN PATENT DOCUMENTS

| | | |
|---|---|---|
| CN | 108557365 | 9/2018 |
| JP | H5-242360 A | 9/1993 |
| JP | 2004-005115 A | 1/2004 |
| JP | 2004-206526 A | 7/2004 |
| JP | 2013-182457 A | 9/2013 |
| JP | 2014-235530 A | 12/2014 |
| JP | 2014235530 A * | 12/2014 |
| JP | 2016-004524 A | 1/2016 |
| WO | 2017/163909 A1 | 9/2017 |

OTHER PUBLICATIONS

International Search Report for PCT Application No. PCT/JP2019/038509, dated Nov. 12, 2019.
Chinese Notice of Allowance for CN Application No. 201980067846.8, dated Sep. 23, 2022 with English Translation.
Chinese Office Action for CN Application No. 201980067846.8 dated May 7, 2022 with English Translation.

* cited by examiner

Fig. 10

<CUSTOMER INFORMATION MANAGEMENT TABLE> 1210

| CUSTOMER ID | FEATURE DATA | IDENTIFICATION INFORMATION OF LOCATED AREA | PURCHASE CANDIDATE PRODUCT INFORMATION | | | |
|---|---|---|---|---|---|---|
| | | | PRODUCT NAME | PRODUCT CODE | QUANTITY OF PRODUCT | PRODUCT IMAGE |
| G0001 | GENDER:<br>TOP WEAR:WHITE<br>BOTTOM WEAR:<br>GRAY<br>OTHER: | AREA 1 | PRODUCT A | 0004 | 1 | IMAGE DATA A |

1211

| CUSTOMER ID | FEATURE DATA | IDENTIFICATION INFORMATION OF LOCATED AREA | PURCHASE CANDIDATE PRODUCT INFORMATION | | | |
|---|---|---|---|---|---|---|
| | | | PRODUCT NAME | PRODUCT CODE | QUANTITY OF PRODUCT | PRODUCT IMAGE |
| G0001 | GENDER:<br>TOP WEAR:WHITE<br>BOTTOM WEAR:<br>GRAY<br>OTHER: | AREA 2 | PRODUCT A | 0004 | 1 | IMAGE DATA A |
| | | | PRODUCT B | 0005 | 1 | IMAGE DATA B |
| G0002 | GENDER:<br>TOP WEAR:GRAY<br>BOTTOM WEAR:<br>GRAY<br>OTHER: | AREA 1 | PRODUCT E | 0008 | 1 | IMAGE DATA E |

<PRODUCT POSITION INFORMATION TABLE>

| AREA IDENTIFICATION INFORMATION | AREA 4 | AREA 3 | AREA 2 | AREA 1 |
|---|---|---|---|---|
| PRODUCT NAME (UPPER SECTION) | PRODUCT D | PRODUCT C | PRODUCT B | PRODUCT A |
| DETECTION RANGE OF PRODUCT SELECTION MOTION ASSOCIATED WITH PRODUCT | X=−2~−1<br>Y=1~2<br>Z=3~4 | X=−1~0<br>Y=1~2<br>Z=3~4 | X=0~1<br>Y=1~2<br>Z=3~4 | X=1~2<br>Y=1~2<br>Z=3~4 |
| PRODUCT NAME (LOWER SECTION) | PRODUCT H | PRODUCT G | PRODUCT F | PRODUCT E |
| DETECTION RANGE OF PRODUCT SELECTION MOTION ASSOCIATED WITH PRODUCT | X=−2~−1<br>Y=2~3<br>Z=3~4 | X=−1~0<br>Y=2~3<br>Z=3~4 | X=0~1<br>Y=2~3<br>Z=3~4 | X=1~2<br>Y=2~3<br>Z=3~4 |

<PRODUCT INFORMATION TABLE>

| PRODUCT NAME | PRODUCT CODE | IDENTIFICATION INFORMATION OF PRODUCT IMAGE |
|---|---|---|
| PRODUCT A | 0004 | IMAGE DATA A |
| PRODUCT B | 0005 | IMAGE DATA B |
| PRODUCT C | 0006 | IMAGE DATA C |
| PRODUCT D | 0007 | IMAGE DATA D |
| PRODUCT E | 0008 | IMAGE DATA E |
| PRODUCT F | 0009 | IMAGE DATA F |
| PRODUCT G | 0010 | IMAGE DATA G |
| PRODUCT H | 0011 | IMAGE DATA H |

<SIMILAR PRODUCT INFORMATION TABLE>

| PRODUCT NAME | SIMILAR PRODUCT NAME | PRODUCT CODE | IDENTIFICATION INFORMATION OF PRODUCT IMAGE |
|---|---|---|---|
| PRODUCT A | PRODUCT A' | 0012 | IMAGE DATA A' |
| PRODUCT B | PRODUCT B' | 0013 | IMAGE DATA B' |
| PRODUCT C | PRODUCT C' | 0014 | IMAGE DATA C' |
| PRODUCT D | PRODUCT D' | 0015 | IMAGE DATA D' |
| PRODUCT E | PRODUCT E' | 0016 | IMAGE DATA E' |
| PRODUCT F | PRODUCT F' | 0017 | IMAGE DATA F' |
| PRODUCT G | PRODUCT G' | 0018 | IMAGE DATA G' |
| PRODUCT H | PRODUCT H' | 0019 | IMAGE DATA H' |

US 11,710,114 B2

PRODUCT PURCHASE SUPPORT SYSTEM, PRODUCT PURCHASE SUPPORT DEVICE AND METHOD, POS TERMINAL DEVICE, AND NON-TRANSITORY COMPUTER READABLE MEDIUM

This application is a National Stage Entry of PCT/JP2019/038509 filed on Sep. 30, 2019, which claims priority from Japanese Patent Application 2018-194909 filed on Oct. 16, 2018, the contents of all of which are incorporated herein by reference, in their entirety.

TECHNICAL FIELD

The present invention relates to a product purchase support system, a product purchase support device and method, a POS terminal device, and a non-transitory computer readable medium and, particularly, to a product purchase support system, a product purchase support device and method, a POS terminal device, and a non-transitory computer readable medium that support the purchase of a product by a customer.

BACKGROUND ART

Products are conventionally displayed on a showcase (display rack) for sale in a variety of stores. In such stores, a customer orally places an order for a desired product with a staff, which is less convenient and requires a long time for checkout.

In regard to this point, according to a showcase-integrated cash register disclosed in Patent Literature 1, when a customer specifies a product and its quantity by operating a product key corresponding to the display position of this product, the product, the quantity of the product, the unit price of the product and the like are displayed on a display installed on the backside of the showcase or a price display installed on a corner of the top surface of the showcase. Then, a staff orally confirms the purchase details with the customer, and if there is no problem, presses a confirmation key of a keyboard to thereby execute transaction. In this way, it is intended to save a staff from having to enter a product and a quantity into a cash register and thereby improve the workability of the staff.

CITATION LIST

Patent Literature

PTL1: Japanese Unexamined Patent Application Publication No. H05-242360

SUMMARY OF INVENTION

Technical Problem

However, according to the showcase-integrated cash register disclosed in Patent Literature 1, when purchasing a product, a customer needs to specify a product and the quantity of this product by operating an individual product key corresponding to the display position of the product, and further the customer is unable to check a selected product and the quantity of this product, which is less convenient.

In view of the above problems, an object of the present invention is to provide a product purchase support system, a product purchase support device and method, a POS terminal device, and a non-transitory computer readable medium that improve the efficiency of checkout processing for product sales and enhance the convenience of customers when purchasing a product.

Solution to Problem

A product purchase support system according to the present invention includes a depth camera installed on a display rack of products or installed in close proximity to the display rack; a product purchase support device including a first display device configured to display information related to a product; and a POS terminal device configured to perform checkout processing for a product, wherein the product purchase support device includes a motion detection means for detecting a motion of a customer on the basis of a captured image and three-dimensional coordinate information output from the depth camera, a display control means for controlling the first display device, and a communication means for performing data communication with the POS terminal device, when the motion detection means detects a product selection motion of selecting a product by the customer, the motion detection means identifies a product selected by the customer and generates product information related to the product selected by the customer, the display control means displays the product information on the first display device, and the communication means outputs the product information to the POS terminal device.

Advantageous Effects of Invention

According to the present invention, there are provided a product purchase support system, a product purchase support device, and a POS terminal device that improve the efficiency of checkout processing for product sales and enhance the convenience of customers when purchasing a product.

BRIEF DESCRIPTION OF DRAWINGS

FIG. 10 is a view showing an example of a customer information management table.

FIG. 11 is a view showing an example of a product position information table.

FIG. 12 is a view showing an example of a product information table and a similar product information table.

DESCRIPTION OF EMBODIMENTS

First Example Embodiment

Figure 1:
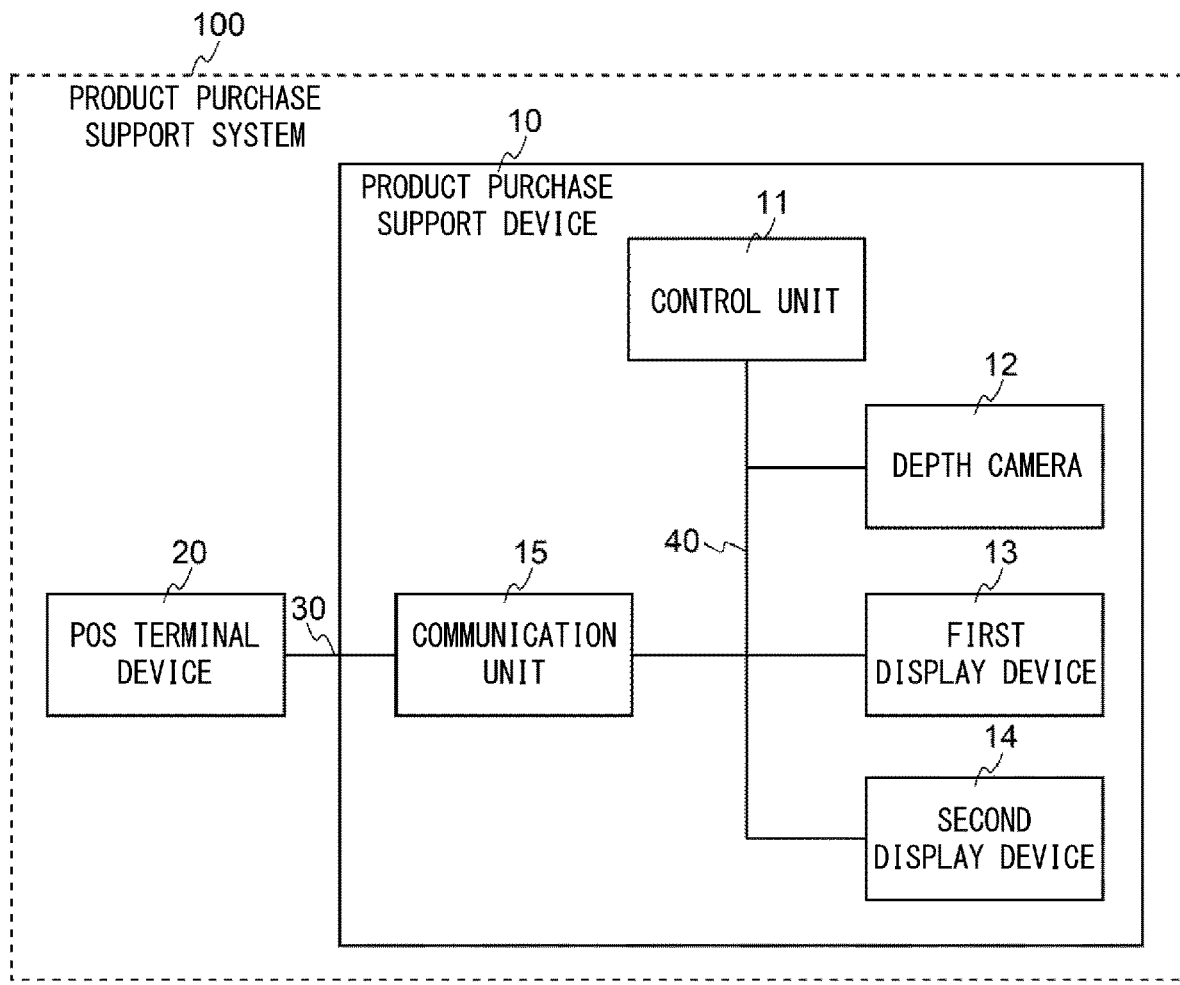
FIG. 1 is a block diagram showing the configuration of a product purchase support system according to a first example embodiment of the present invention.

A first example embodiment of the present invention is described hereinafter with reference to the drawings. FIG. 1 is a block diagram showing the configuration of a product purchase support system 100 according to the first example embodiment of the present invention. The product purchase support system 100 includes a product purchase support device 10 and a POS (Point-Of-Sale) terminal device 20. The product purchase support device 10 and the POS terminal device 20 can perform data communication with each other through a communication cable 30. Note that the product purchase support device 10 and the POS terminal device 20 may perform data communication with each other through radio waves.

The product purchase support device 10 is a device for supporting the purchase of a product by a customer, and it includes a control unit 11, a depth camera 12, a first display device 13, a second display device 14, and a communication unit 15. The control unit 11, the depth camera 12, the first display device 13, the second display device 14, and the communication unit 15 can perform data communication with one another through a communication cable 40.

The control unit 11 is a device that controls the depth camera 12, the first display device 13, the second display device 14 and the communication unit 15, and implements the functions of the product purchase support device 10. The functions of the control unit 11 are described later with reference to FIG. 3.

The depth camera 12 is a device that captures an image of an area to be photographed and generates a captured image, and also generates three-dimensional coordinate information of an object contained in the area to be photographed, and outputs the captured image and the three-dimensional coordinate information. The depth camera 12 performs image capture at predetermined timing, and generates the three-dimensional coordinate information for each captured image. The depth camera 12 supplies the captured image and the three-dimensional coordinate information to the control unit 11 through the communication cable 40.

The first display device 13 is a device that displays various image data containing information (which is referred to hereinafter as "purchase candidate product information") related to a product selected by a customer. Although the first display device 13 is composed of one display device in this example embodiment, it may be composed of a plurality of display devices in another example embodiment.

The second display device 14 is a contact sensing display device such as a touch panel, and it is a device that is able to receive an instruction from a customer. The second display device 14 displays various GUI screens containing the purchase candidate product information.

The communication unit 15 is a device that performs data communication with the POS terminal device 20. The communication unit 15 transmits information related to a product which a customer has confirmed to purchase to the POS terminal device 20. Although the control unit 11 and the communication unit 15 are configured as separate devices in the example embodiment shown in FIG. 1, the communication unit 15 may be integrated into the control unit 11.

The POS terminal device 20 is a device that performs checkout processing for products. The POS terminal device 20 performs checkout processing for a product selected by a customer by using information received from the product purchase support device 10.

Figure 2:
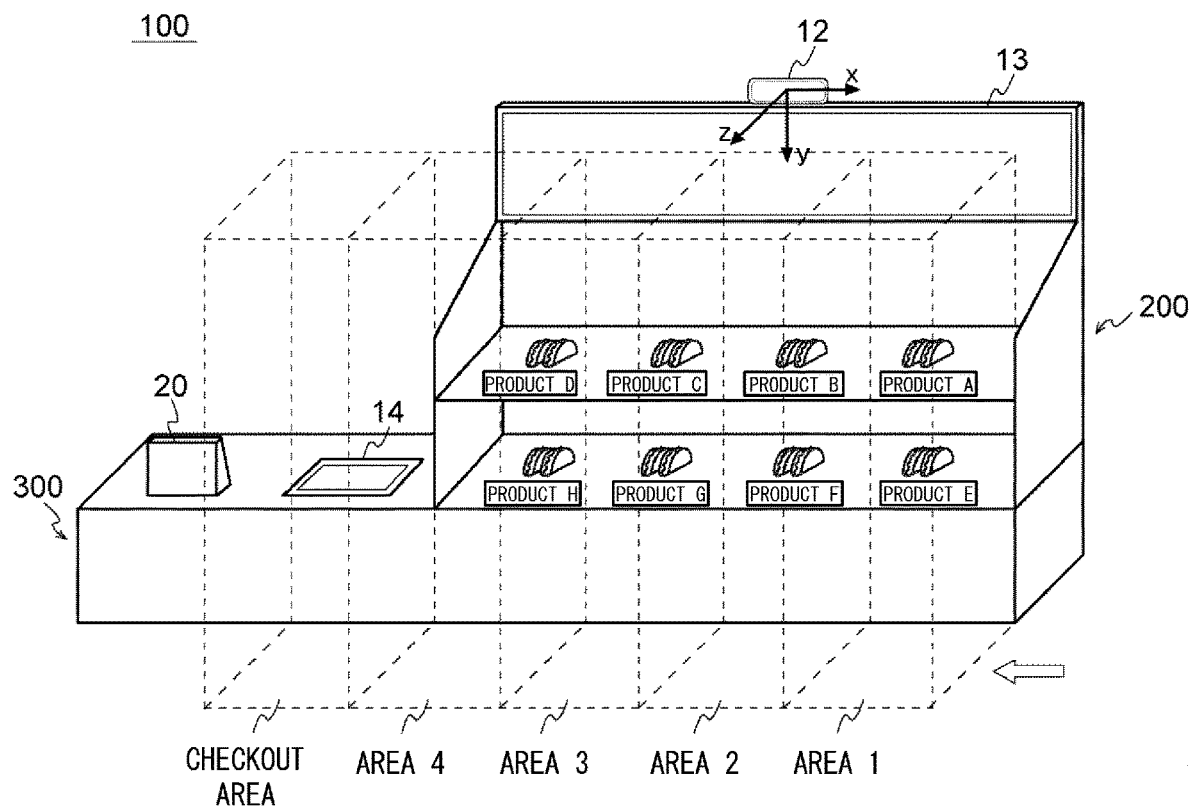
FIG. 2 is a perspective view schematically showing the product purchase support system according to the first example embodiment of the present invention.

FIG. 2 is a schematic view showing the product purchase support system 100 according to the first example embodiment of the present invention. The product purchase support system 100 is used in combination with a display rack 200 for products and a counter 300. As shown in FIG. 2, in three-dimensional coordinate space with respect to the depth camera 12 as the origin, the width direction of the display rack 200 for products is the x-axis, the height direction is the y-axis, and the depth direction is the z-axis. In the example embodiment shown in FIG. 2, the first display device 13 is installed on top of the display rack 200, and the depth camera 12 is installed on top of the first display device 13. The second display device 14 and the POS terminal device 20 are installed on the top surface of the counter 300. Note that the first display device 13 may be installed inside or near the display rack 200 or installed separately from the display rack 200. Further, the depth camera 12 may be installed inside, on top or on the side of the display rack 200 or installed near the display rack 200.

As shown in FIG. 2, an area in front of the display rack 200 and the counter 300 is partitioned into a plurality of areas. In this example embodiment, it is partitioned into five areas: areas 1 to 4 and a checkout area. A customer who purchases a product can perform the motion (which is referred to hereinafter as "product selection motion") of selecting a product displayed on the display rack 200 as moving from the area 1 to the checkout area, and thereby select a product which the customer desires to purchase. Note that the area in front of the display rack 200 and the counter 300 may be partitioned into an arbitrary number of areas depending on the size of the display rack 200 and the counter 300.

Figure 3:
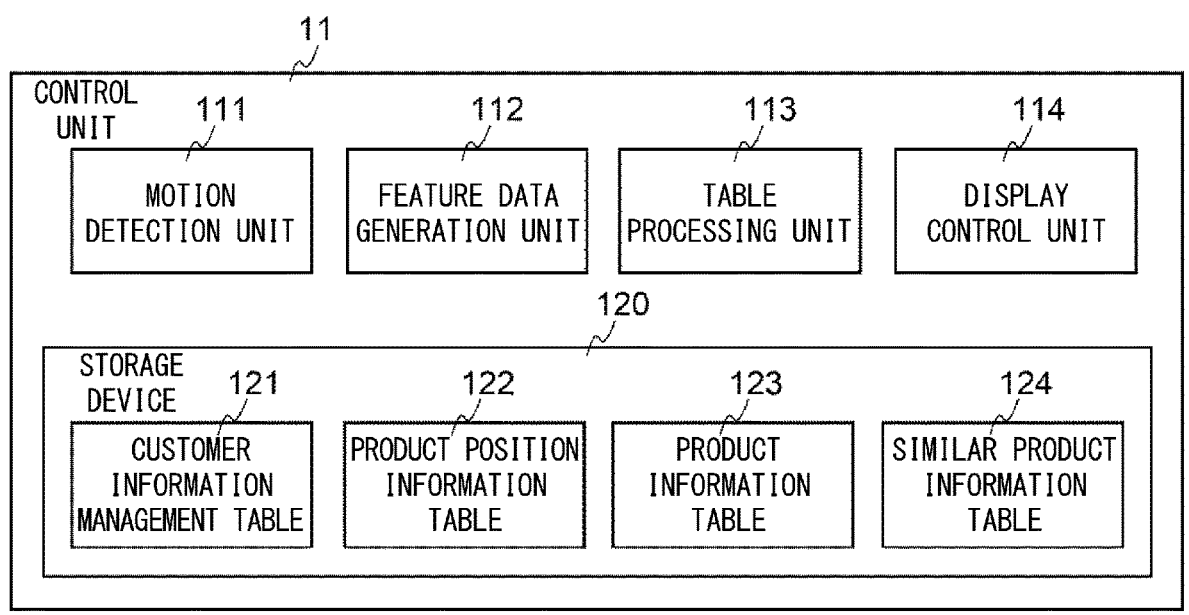
FIG. 3 is a block diagram showing functions of a control unit of a product purchase support device according to the first example embodiment of the present invention.

FIG. 3 is a block diagram showing the functions of the control unit 11 of the product purchase support device 10 according to the first example embodiment of the present invention. The control unit 11 includes a CPU (Central Processing Unit) (not shown), which is an arithmetic unit, and a storage device 120 composed of ROM (Read Only Memory) and RAM (Random Access Memory). The CPU loads a program of the present invention stored in the ROM into the RAM and executes this program. The program of the present invention includes a motion detection unit 111, a feature data generation unit 112, a table processing unit 113, and a display control unit 114, which are program modules.

The motion detection unit 111 is a program module that detects the motion of a customer in a monitored area that is composed of the areas 1 to 4 and the checkout area on the basis of the captured image and the three-dimensional coordinate information output from the depth camera 12.

Figure 5:
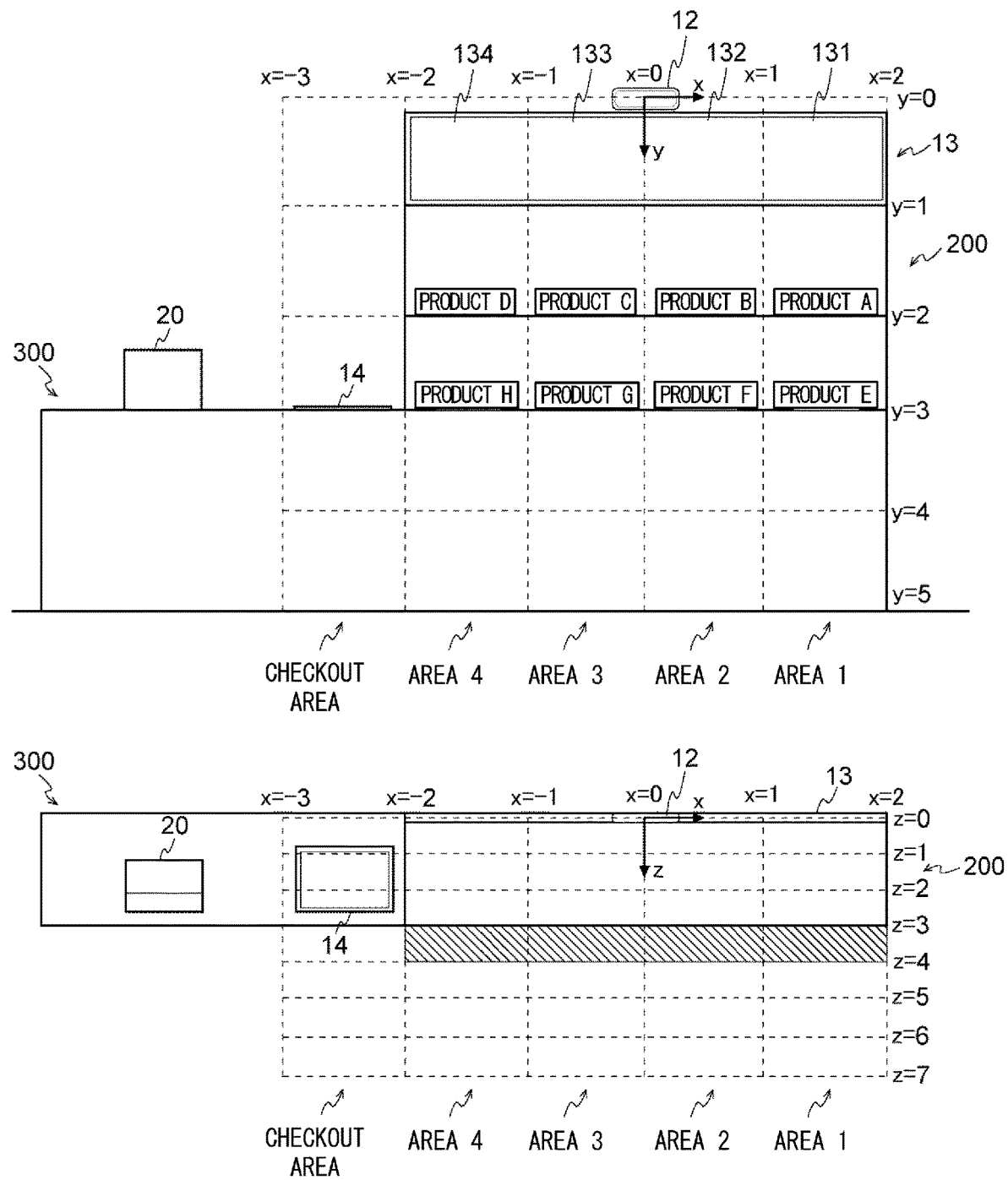
FIG. 5 is an elevation view and a plan view schematically showing the product purchase support system according to the first example embodiment of the present invention.

The monitored area can be defined by position coordinates (x,y,z)=(−3~2, 0~5, 3~7) in the three-dimensional coordinate space with respect to the depth camera 12 as the origin as shown in FIG. 5. The motion detection unit 111 identifies a captured image to be analyzed on the basis of the three-dimensional coordinate information, analyzes this captured image, and determines whether (1) there is a customer in the monitored area or not, (2) a customer in the monitored area has performed the product selection motion or not, or (3) a customer in the monitored area has moved or not.

In this example embodiment, a customer's action of pointing at a product is adopted as the product selection motion. The detection range of the product selection motion can be the range defined by position coordinates (x,y,z)=(−2~2, 1~3, 3~4) as shown in FIG. 5. Further, the detection range of the product selection motion is segmented for each product. The motion detection unit 111 identifies a captured image in the detection range of the product selection motion on the basis of the three-dimensional coordinate information, and analyzes this captured image. When the motion detection unit 111 detects the product selection motion, it identifies the product selected by this customer and generates product information related to this product.

Figure 6:
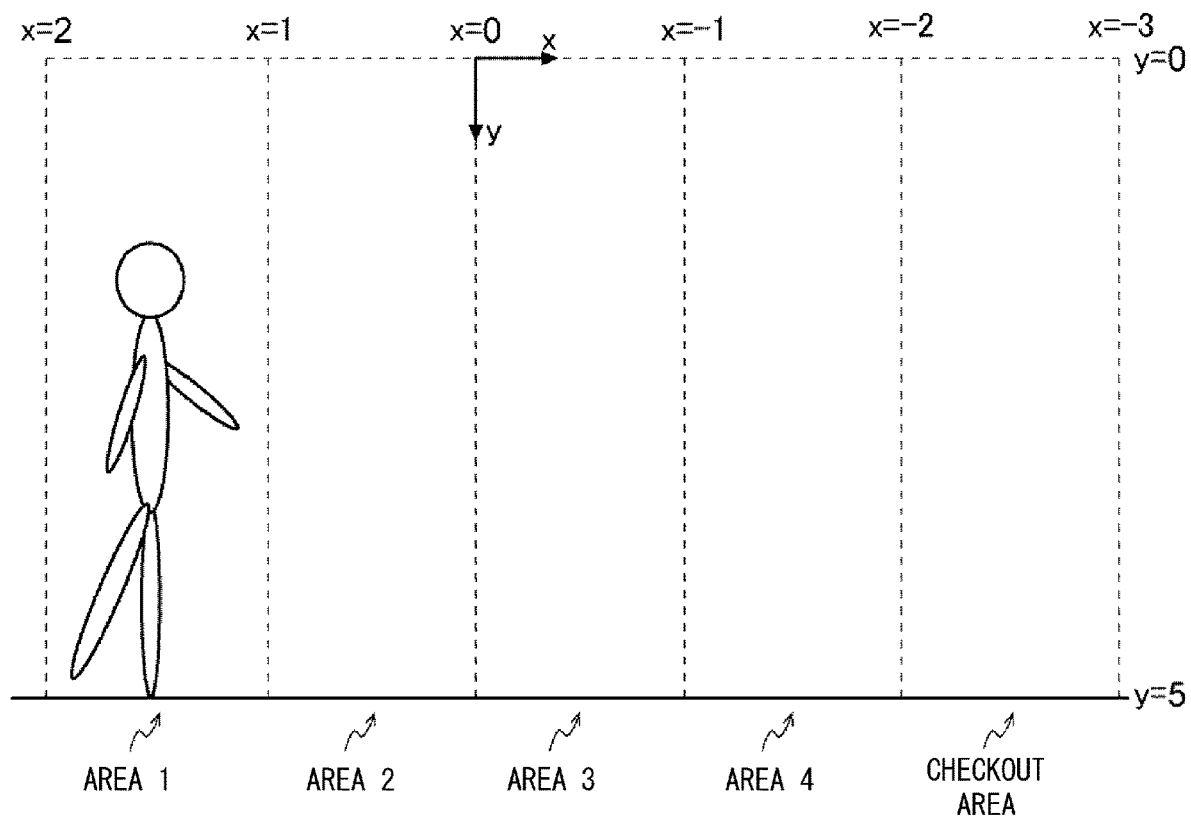
FIG. 6 is a view showing an example of a captured image output from a depth camera.

The feature data generation unit 112 is a program module that generates feature data of a customer in the monitored area on the basis of the captured image and the three-dimensional coordinate information output from the depth camera 12. As the feature data of a customer, information that identifies a customer, such as the color of top and bottom wear, the gender, with or without glasses, and with or without a watch, for example, can be used. The feature data generation unit 112 identifies a captured image in the monitored area as shown in FIG. 6 on the basis of the three-dimensional coordinate information, analyzes this captured image, and generates the feature data of a customer for each area.

The table processing unit 113 is a program module that processes a customer information management table 121, a product position information table 122, a product information table 123, and a similar product information table 124 stored in the storage device 120.

The customer information management table 121 is a data table in which a customer ID, feature data, identification information of an area where a customer is located (which is referred to hereinafter as "located area"), which are customer information, and purchase candidate product information are registered as shown in FIG. 10. In a customer information management table 1210 shown in FIG. 10, information in the case where a customer (customer ID: G0001) located in the area 1 selects a product A is registered. In a customer information management table shown 1211, information in the case where this customer moves to the area 2 and then selects a product B, and another customer (customer ID: G0002) selects a product E in the area 1 are registered. Note that a default value for the quantity of a product is 1 in this example embodiment.

The product position information table 122 is a data table in which area identification information, a product name, and a detection range of the product selection motion are registered in association with one another as shown in FIG. 11. The product information table 123 is a data table in which a product name, a product code, and identification information of a product image are registered in association with one another as shown in FIG. 12. The similar product information table 124 is a data table in which a product name, a similar product name similar to this product, a product code of the similar product, and identification information of a similar product image are registered in association with one another as shown in FIG. 12.

Figure 13:
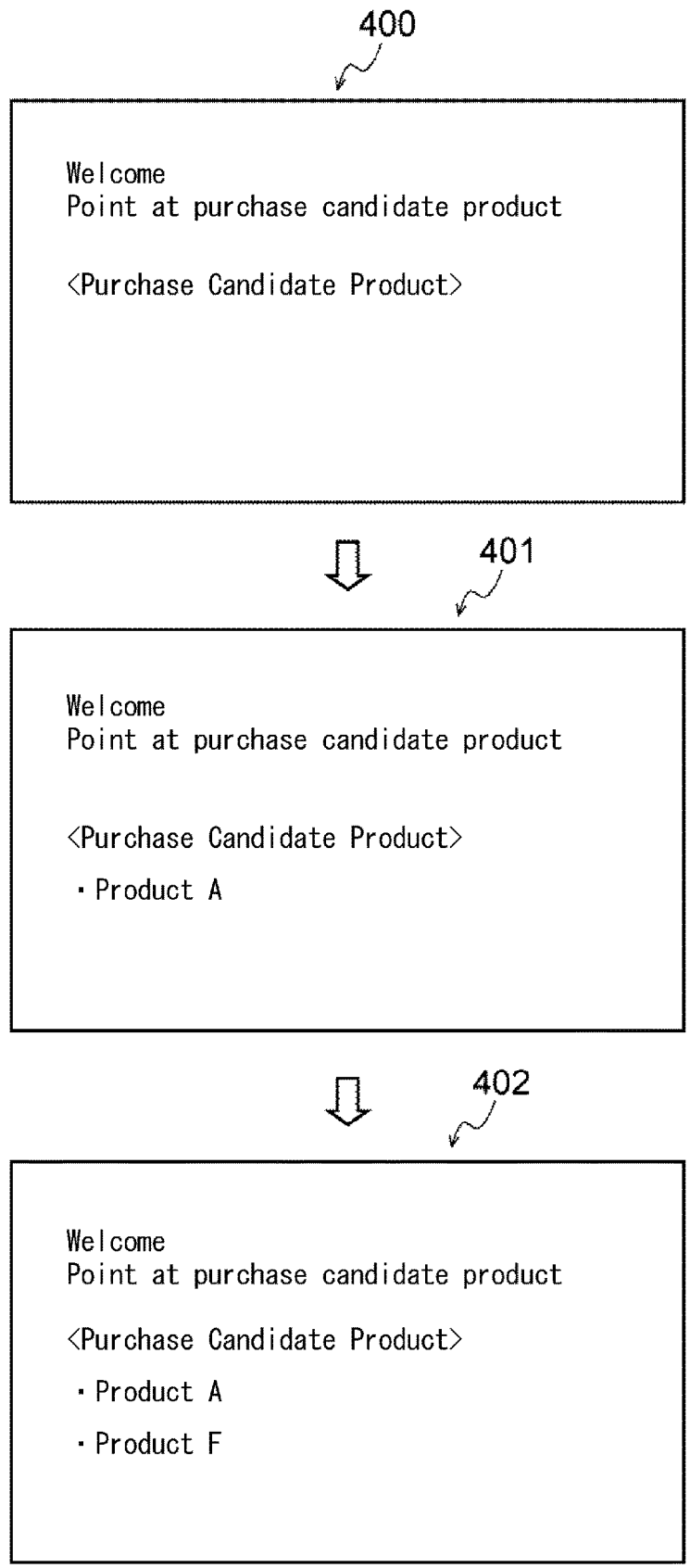
FIG. 13 is a view showing an example of an image displayed on a first display device.

The display control unit 114 is a program module that controls screen display of the first display device 13 and the second display device 14. The display control unit 114 displays images 400 to 402 as shown in FIG. 13 on each of screen areas 131 to 134 of the first display device 13 corresponding to the areas 1 to 4 shown in FIG. 5, respectively. The image 400 is an image that forms an initial screen of each image area of the first display device 13. The image 401 is an image that is displayed when a customer selects a product A. The image 402 is an image that is displayed when the customer who has selected the product A further selects a product F. Note that, in addition to a product name, the quantity of a product selected by a customer or the image of a product may be displayed on the images 400 to 402.

Figure 14:
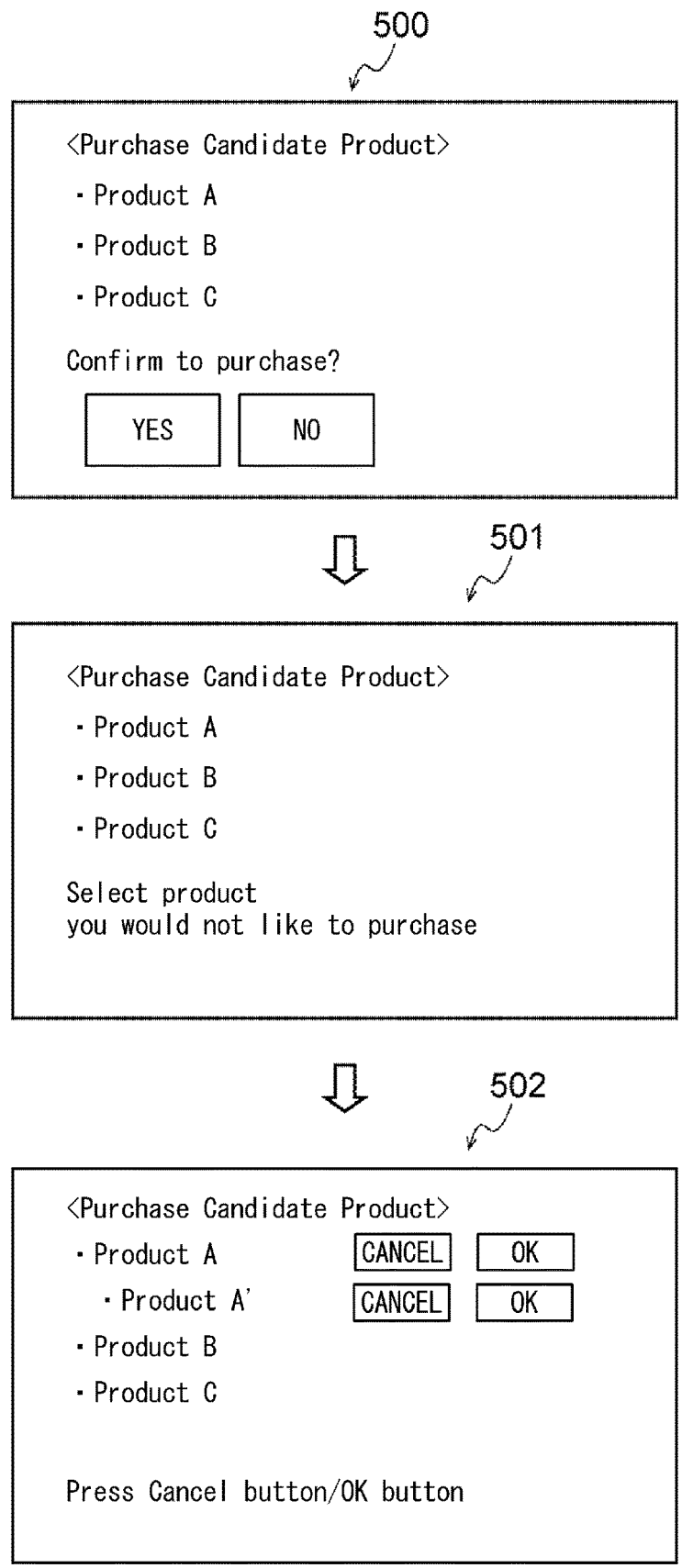
FIG. 14 is a view showing an example of a GUI screen displayed on a second display device.

Further, the display control unit 114 displays GUI screens 500 to 502 as shown in FIG. 14 on the second display device 14. The GUI screen 500 is a first GUI screen that is displayed on the second display device 14 when a customer moves to the checkout area, and the purchase candidate product information of this customer is displayed therein. The GUI screen 501 is a second GUI screen that is displayed when this customer has selected "No" button of the GUI screen 500. The GUI screen 502 is a third GUI screen that is displayed when this customer has selected the product A as a product which the customer does not desire to purchase. On the GUI screen 502, the name "product A" of a product that is similar to the product A is displayed as a product that is not desired to be purchased, and also "Cancel" button and "OK" button are displayed for each of the product A and the product A'. In addition to a product name, the image of a product may be displayed on the GUI screens 500 to 502.

Figure 15:
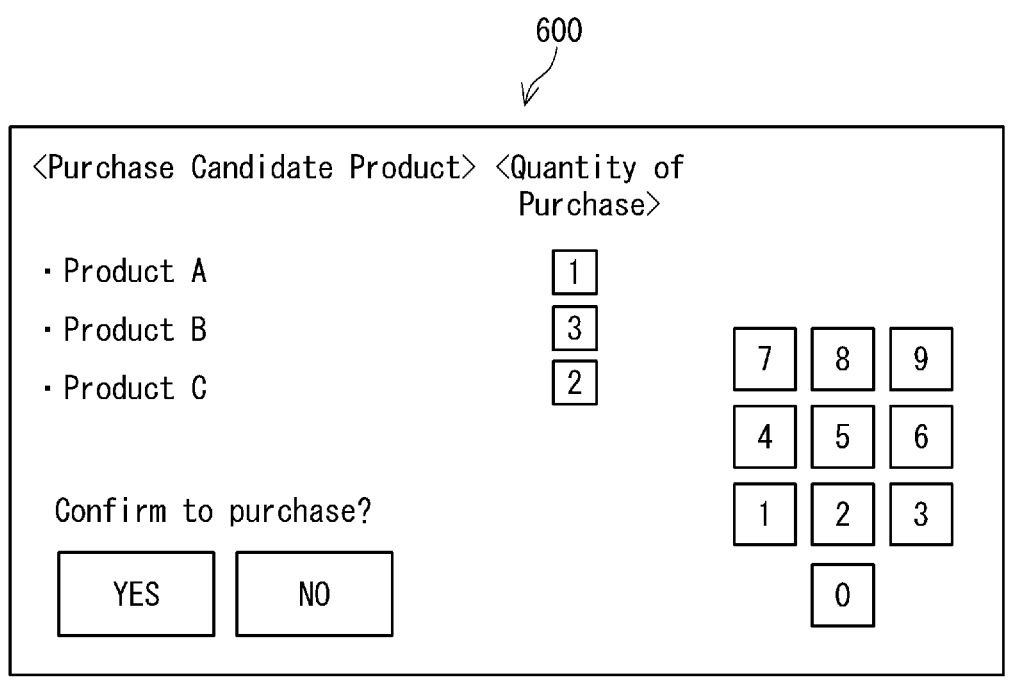
FIG. 15 is a view showing another example of a GUI screen displayed on the second display device.

FIG. 15 is a view showing another example of a first GUI screen that is displayed on the second display device 14. On a GUI screen 600, the name and quantity of a product selected by a customer are displayed as the product information, and also a numeric keypad for specifying the quantity of a product is displayed. In addition, the image of a product may be displayed on the GUI screen 600.

In the storage device 120, the customer information management table 121, the product position information table 122, the product information table 123, the similar product information table 124, image data of a product, image data that forms display screens of the first display device 13 and the second display device 14, and captured images and three-dimensional coordinate information output from the depth camera 12 are stored. When the control unit 11 receives a captured image and three-dimensional coordinate information from the depth camera 12, it stores them into the storage device 120. The storage device 120 stores at least sufficient number of captured images and three-dimensional coordinate information to detect a customer's motion.

Figure 4:
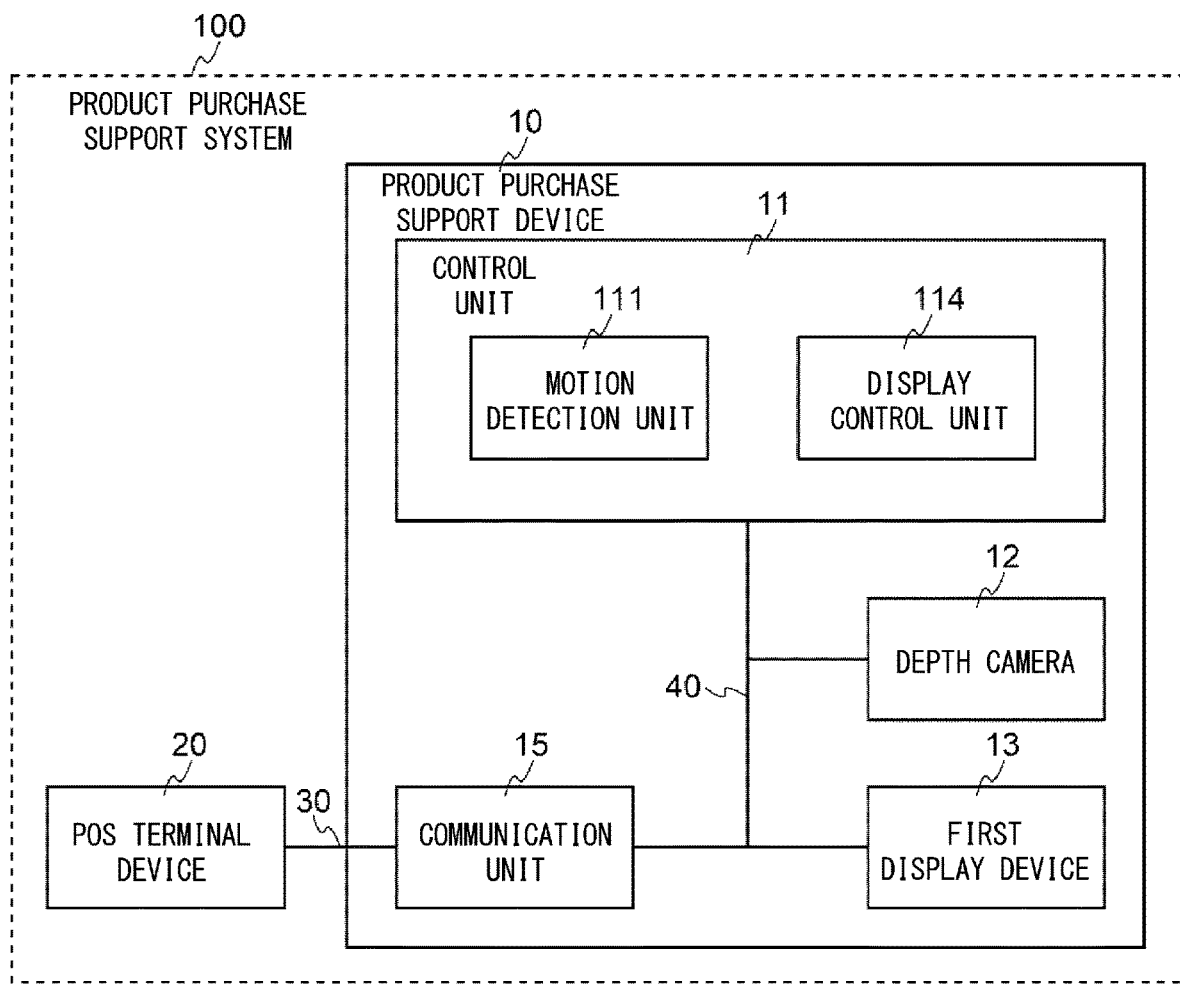
FIG. 4 is a block diagram showing major components of the product purchase support system according to the first example embodiment.

FIG. 4 is a block diagram showing major components of the product purchase support system 100 according to the first example embodiment. The product purchase support system 100 includes the product purchase support device 10 and the POS terminal device 20. The product purchase support device 10 includes, as major components, the control unit 11 including the motion detection unit 111 and the display control unit 114, the depth camera 12, the first display device 13, and the communication unit 15.

Figure 7:
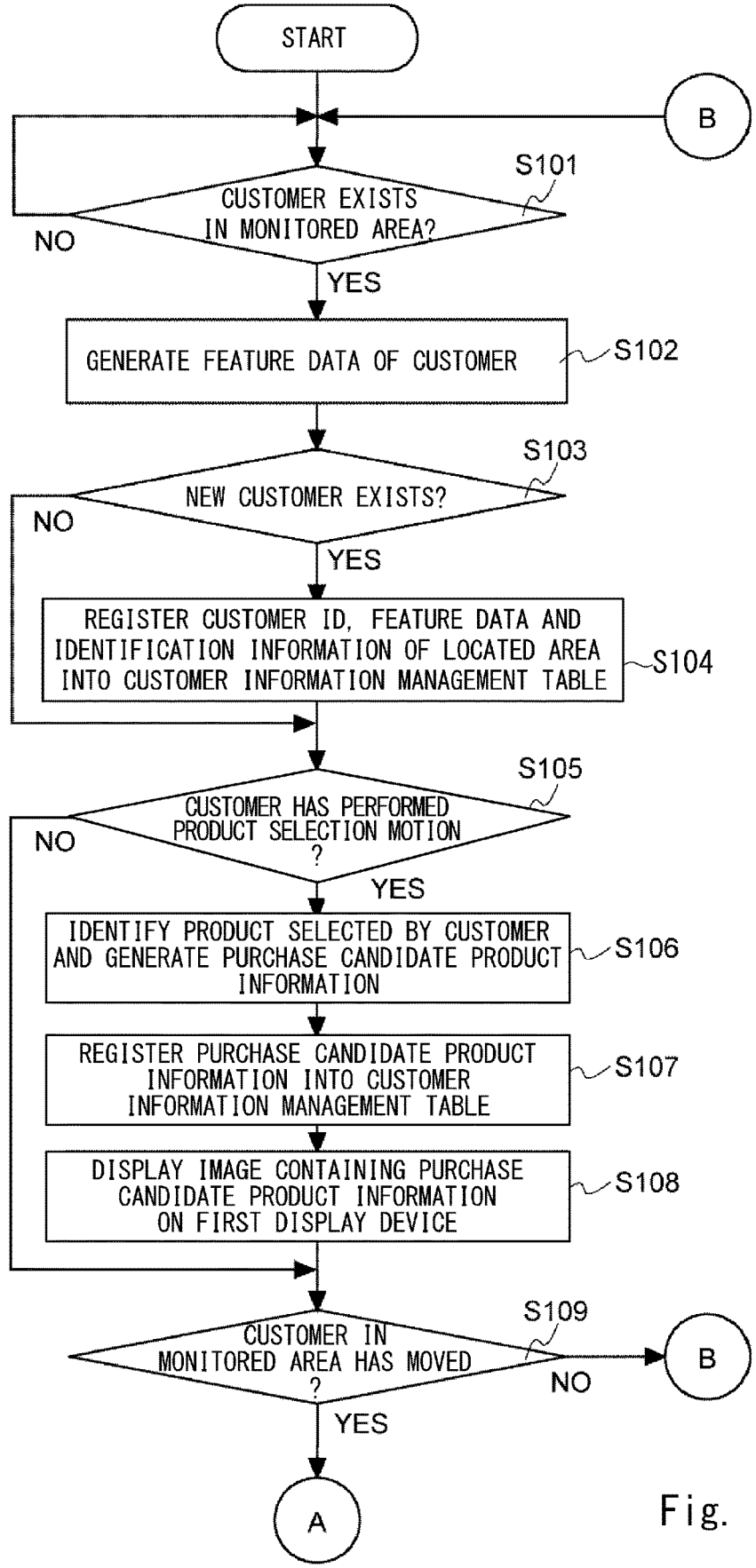
FIG. 7 is a flowchart showing a process performed by the product purchase support device according to the first example embodiment of the present invention.
Figure 8:
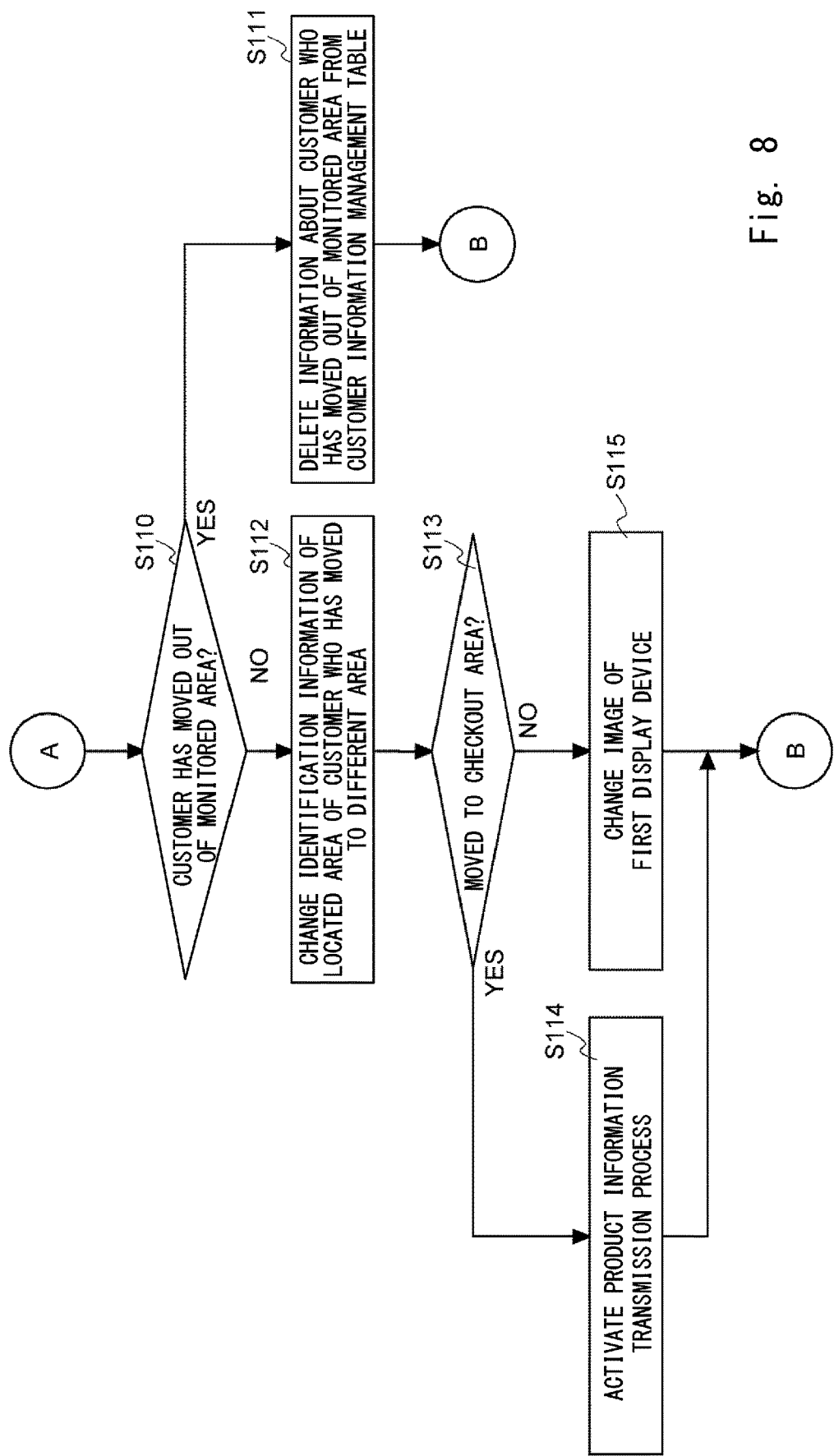
FIG. 8 is a flowchart showing a process performed by the product purchase support device according to the first example embodiment of the present invention.
Figure 9:
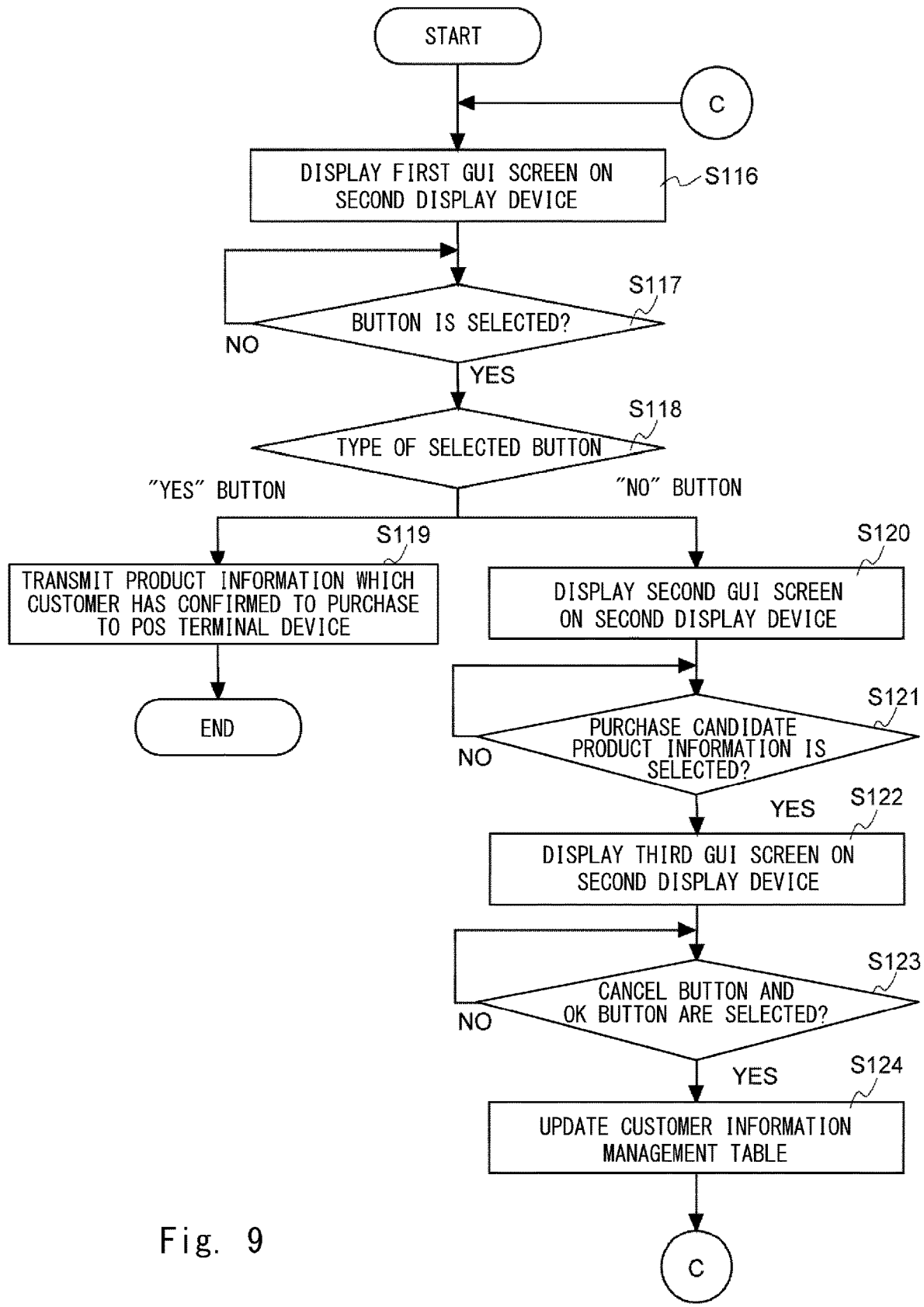
FIG. 9 is a flowchart showing a process performed by the product purchase support device according to the first example embodiment of the present invention.

FIGS. 7, 8 and 9 are flowcharts showing a process performed by the product purchase support system 100 according to the first example embodiment of the present invention. According to the process shown in FIG. 7, when the process starts, in Step S101, the motion detection unit 111 of the control unit 11 acquires a captured image and three-dimensional coordinate information from the storage device 120, and determines whether there is a customer in the monitored area on the basis of the captured image and the three-dimensional coordinate information. To be specific, the motion detection unit 111 identifies a captured image in the monitored area on the basis of the three-dimensional coordinate information, performs pattern matching by using this captured image and a template image showing a person, and thereby detects a customer in the captured image. Then, the motion detection unit 111 determines whether the position coordinates of the customer in the captured image are contained in the monitored area defined by known position coordinates. When the position coordinates of the customer in the captured image are contained in the monitored area, the motion detection unit 111 can determine that there is a customer in the monitored area, and when the position coordinates of the customer in the captured image are not contained in the monitored area, the motion detection unit 111 can determine that there is no customer in the monitored area.

When there is no customer in the monitored area (NO), the processing of Step S101 is performed again. On the other hand, when there is a customer in the monitored area (YES), the process proceeds to Step S102. In Step S102, the feature data generation unit 112 generates feature data of the customer in the monitored area on the basis of the captured image and the three-dimensional coordinate information acquired by the motion detection unit 111 in Step S101. In Step S103, the motion detection unit 111 determines whether there is a new customer in the monitored area. To be specific, the motion detection unit 111 references the customer information management table 121 and determines whether information about a customer having the feature data generated in Step S102 is registered or not. When information about all of customers for whom the feature data is generated is registered, the motion detection unit 111 can determine that there is no new customer in the monitored area, and when information about at least one customer for whom the feature data is generated is not registered, the motion detection unit 111 can determine that there is a new customer in the monitored area.

When there is no new customer in the monitored area (NO), the process proceeds to Step S105. When, on the other hand, there is a new customer in the monitored area (YES), the process proceeds to Step S104. In Step S104, the table processing unit 113 creates a customer ID of this new customer, and registers the customer ID, the feature data, and the identification information of the located area of this customer into the customer information management table 121.

In Step S105, the motion detection unit 111 acquires a captured image and three-dimensional coordinate information from the storage device 120, and determines whether a customer has performed the product selection motion or not on the basis of the captured image and the three-dimensional coordinate information. To be specific, the motion detection unit 111 identifies a captured image in the motion detection range on the basis of the three-dimensional coordinate information, performs pattern matching by using this captured image and a template image showing a person's hand, and thereby detects a customer's hand in the captured image. Then, the motion detection unit 111 references the product position information table 122 and determines whether the position coordinates of the detected customer's hand are contained in any detection range of the product selection motion, and can thereby determine whether the customer has performed the product selection motion or not. The determination as to whether a customer has performed the product selection motion or not is made for all of customers located in the area 1 to the area 4. Note that whether a customer has performed the product selection motion or not may be determined by using an object different from a customer's hand.

When the customer has not performed the product selection motion (NO), the process proceeds to Step S109. On the other hand, when the customer has performed the product selection motion (YES), the process proceeds to Step S106. In Step S106, the motion detection unit 111 identifies a product selected by this customer and generates purchase candidate product information of this product. To be specific, the motion detection unit 111 references the product position information table 122, identifies the detection range of the product selection motion that contains the position coordinates of the product selection motion of this customer, and identifies a product name related to this detection range of the product selection motion. Then, the motion detection unit 111 references the product information table 123, identifies a product code and identification information of image data related to this product name, and uses the product name, the product code, the quantity of the product and the identification information of image data as the purchase candidate product information.

In Step S107, the table processing unit 113 registers these purchase candidate product information into the customer information management table 121. In Step S108, the display control unit 114 displays an image containing the purchase candidate product information related to this customer on the screen area of the first display device 13 which corresponds to the located area of this customer. To be specific, the areas 1 to 4 correspond to the screen areas 131 to 134 of the first display device 13, respectively, and the image containing the purchase candidate product information related to this customer is displayed on one of the screen areas 131 to 134 which corresponds to the located area of this customer.

In Step S109, the motion detection unit 111 acquires a captured image and three-dimensional coordinate information from the storage device 120, and determines whether the customer in the monitored area has moved out of the located area or not on the basis of the captured image and the three-dimensional coordinate information. To be specific, the motion detection unit 111 identifies a captured image in the motion detection range on the basis of the three-dimensional coordinate information, performs pattern matching by using this captured image and a template image showing a person, and thereby detects a customer in the captured image. Then, the motion detection unit 111 determines whether the position coordinates of the customer in the captured image are contained in the located area of this customer defined by known position coordinates, and can thereby determine whether the customer in the monitored area has moved out of the located area or not.

When the customer has not moved out of the located area (NO), the process returns to Step S101. On the other hand, when the customer has moved out of the located area (YES), the process proceeds to Step S110 shown in FIG. 8. In Step S110, the motion detection unit 111 determines whether the customer in the monitored area has moved out of the monitored area or not. To be specific, the motion detection unit 111 determines whether the position coordinates of the customer in the captured image detected in Step S109 are contained in the monitored area defined by known position coordinates. When the position coordinates of the customer in the captured image are not contained in the monitored area, the motion detection unit 111 can determine that the customer has moved out of the monitored area, and when the position coordinates of the customer in the captured image are contained in the monitored area, the motion detection unit 111 can determine that the customer has not moved out of the monitored area.

When the customer has moved out of the monitored area (YES), the process branches to Step S111. In Step S111, the first display device 13 deletes information (customer ID, feature data, identification information of the located area) about the customer who has moved out of the monitored area from the customer information management table 121, and then the process returns to Step S101.

When it is determined in Step S110 that the customer has not moved out of the monitored area (NO), the process branches to Step S112. In Step S112, the table processing unit 113 changes the identification information of the located area of the customer who has moved to a different area to the identification information of the current located area to which the customer has moved in the customer information management table 121. In Step S113, the table processing unit 113 references the customer information management table 121 and determines whether the customer has moved to the checkout area or not. To be specific, when the identification information of the located area of the customer that is registered in the customer information management table 121 is the identification information of the checkout area, the table processing unit 113 can determine that the customer has moved to the checkout area, and when the identification information of the located area of the customer is not the identification information of the checkout area, the table processing unit 113 can determine that the customer has not moved to the checkout area.

When the customer has not moved to the checkout area (NO), the process branches to Step S115. In Step S115, the display control unit 114 changes the image of the screen area of the first display device 13 corresponding to the current area to which this customer has moved and the image of the screen area of the first display device 13 corresponding to the previous area from which this customer has moved. To be specific, the display control unit 114 displays the image that has been displayed on the screen area of the first display device 13 corresponding to the previous area on the screen area of the first display device 13 corresponding to the current area, and when another customer has not moved to the previous area, that is, when there is no customer in the previous area, displays the initial image as shown in FIG. 13 on the screen area of the first display device 13 corresponding to the previous area. When, on the other hand, another customer has moved to the previous area, an image corresponding to this another customer is displayed in the same manner. Those processing are performed on areas where a customer's movement takes place in the area 1 to the area 4. When the display control unit 114 changes the images displayed on those screen areas, the process returns to Step S101.

When it is determined in Step S113 that the customer has moved to the checkout area (YES), the process branches to Step S114. In Step S114, the product information transmission process shown in FIG. 9 is activated, and the process then returns to Step S101. The product information transmission process shown in FIG. 9 is performed in multitask. The product information transmission process shown in FIG. 9 is described hereinafter. In Step S116, the display control unit 114 acquires the purchase candidate product information of the customer located in the checkout area from the customer information management table 121, and displays the first GUI screen containing this purchase candidate product information on the second display device 14. In Step S117, the display control unit 114 determines whether a user has selected a button on the first GUI screen or not. To be specific, the display control unit 114 determines whether information indicating selection of a button is received from the second display device 14 or not. When the information indicating selection of a button is received, the display control unit 114 can determine that the button is selected, and when the information indicating selection of a button is not received, the display control unit 114 can determine that the button is not selected. Identification information of a button selected by a user is added to the information indicating selection of a button.

When a button on the first GUI screen is not selected (NO), the processing of Step S117 is performed again. On the other hand, when a button on the first GUI screen is selected (YES), the process proceeds to Step S118. In Step S118, the display control unit 114 determines which of "Yes" button or "No" button is selected on the basis of the identification information of the button received from the second display device 14. When the "Yes" button is selected, the process branches to Step S119. In Step S119, the display control unit 114 acquires the purchase candidate product information of the customer located in the checkout area from the customer information management table 121, and transmits this purchase candidate product information as the product information which the customer has confirmed to purchase to the POS terminal device 20 through the communication unit 15.

On the other hand, when it is determined in Step S118 that the "No" button is selected, the process branches to Step S120. In Step S120, the display control unit 114 displays the second GUI screen on the second display device 14. In Step S121, the display control unit 114 determines whether the user has selected the purchase candidate product information in the second GUI screen or not. To be specific, the display control unit 114 determines whether information indicating selection of the purchase candidate product information is received from the second display device 14 or not. When the information indicating selection of the purchase candidate product information is received, the display control unit 114 can determine that the user has selected the purchase candidate product information, and when the information indicating selection of the purchase candidate product information is not received, the display control unit 114 can determine that the user has not selected the purchase candidate product information. When the purchase candidate product information in the second GUI screen is not selected (NO), the processing of Step S121 is performed again. When, on the other hand, the purchase candidate product information in the second GUI screen is selected (YES), the process proceeds to Step S122.

In Step S122, the display control unit 114 references the similar product information table 124 and displays the third GUI screen on the second display device 14. In Step S123, the display control unit 114 determines whether a user has selected the Cancel button and the OK button in the third GUI screen. To be specific, the display control unit 114 determines whether information indicating selection of the Cancel button and the OK button is received from the second display device 14 or not. When the information indicating selection of the Cancel button and the OK button is received, the display control unit 114 can determine that the user has selected the Cancel button and the OK button in the third GUI screen, and when the information indicating selection of the Cancel button and the OK button is not received, the display control unit 114 can determine that the user has not selected the Cancel button and the OK button in the third GUI screen. Identification information of a product to be canceled and identification information of a confirmed product are added to the information indicating selection of the Cancel button and the OK button.

When the Cancel button and the OK button are not selected (NO), the processing of Step S123 is performed again. On the other hand, when the Cancel button and the OK button are selected (YES), the process proceeds to Step S124. In Step S124, the table processing unit 113 updates the customer information management table 121 on the basis of the identification information of the product to be canceled and the identification information of the confirmed product received from the second display device 14, and the process returns to Step S116.

The first example embodiment has the following effects. Specifically, the product purchase support device 10 analyzes a captured image in a detection range of a product selection motion and detects a predetermined product selection motion, and thereby identifies a product selected by the customer. Then, the product purchase support device 10 generates purchase candidate product information and transmits it to the POS terminal device 20. Therefore, a staff does not need to orally confirm a product which a customer desires to purchase, which makes checkout processing more efficient. Further, a customer can select a product simply by performing a predetermined product selection motion, which enhances the convenience of customers when purchasing a product.

Further, the product purchase support device 10 displays an image containing purchase candidate product information related to a customer on a screen area of the first display device 13 corresponding to the located area of the customer. Therefore, a customer can easily grasp a product selected by themselves by checking the display screen corresponding to the located area of themselves, which enhances the convenience of customers when purchasing a product. Further, even when a plurality of customers use the product purchase support system 100, each of the customers can check a product selected by themselves, which enhances the convenience of customers when purchasing a product.

Further, the product purchase support device 10 displays a GUI screen containing the purchase candidate product information of a customer located in the checkout area on the second display device 14. Therefore, a customer can confirm the purchase of a product by using a screen on which the purchase candidate product information of a product selected by themselves is displayed without orally telling a desired product to a staff, which enhances the convenience of customers when purchasing a product.

Second Example Embodiment

Figure 16:
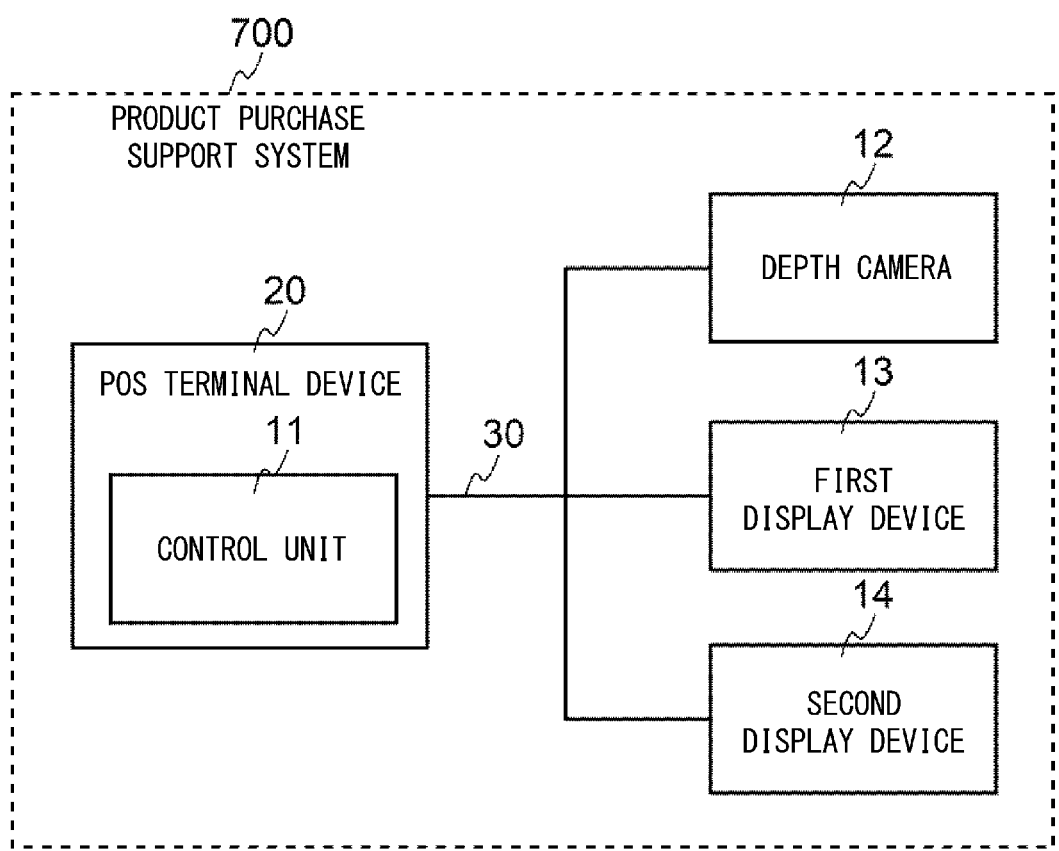
FIG. 16 is a block diagram showing the configuration of a product purchase support system according to a second example embodiment of the present invention.

FIG. 16 is a block diagram showing the configuration of a product purchase support system 700 according to a second example embodiment of the present invention. The product purchase support system 700 includes the POS terminal device 20, the depth camera 12, the first display device 13, and the second display device 14. The POS terminal device 20 includes the control unit 11, which is included in the product purchase support device 10 according to the first example embodiment, and it can perform data communication with the depth camera 12, the first display device 13, and the second display device 14 through the communication cable 30. In the second example embodiment, the POS terminal device 20 implements the functions of the product purchase support device 10 according to the first example embodiment, which allows the reduction of the number of devices to be installed in a store and also achieves space saving compared with the first example embodiment.

Third Example Embodiment

Figure 17:
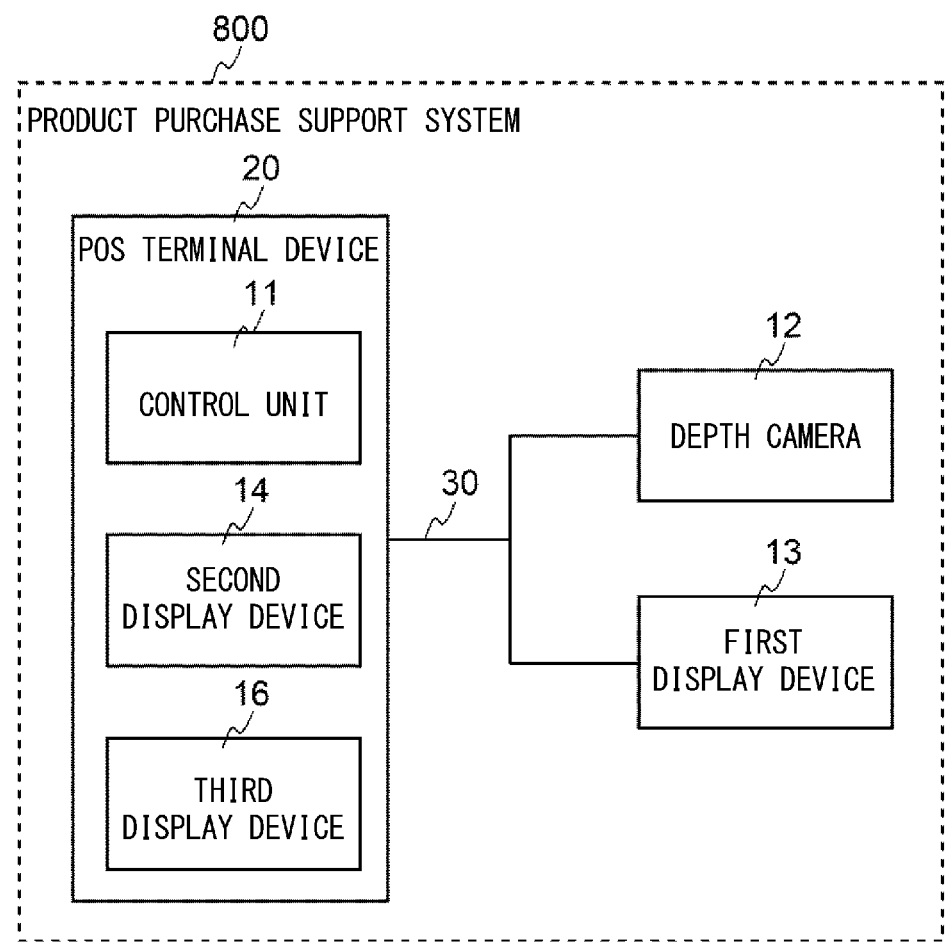
FIG. 17 is a block diagram showing the configuration of a product purchase support system according to a third example embodiment of the present invention.

FIG. 17 is a block diagram showing the configuration of a product purchase support system 800 according to a third example embodiment of the present invention. The product purchase support system 800 includes the POS terminal device 20, the depth camera 12, and the first display device 13. The POS terminal device 20 includes the control unit 11 and the second display device 14, which are included in the product purchase support device 10 according to the first example embodiment, and a third display device 16, and it can perform data communication with the depth camera 12 and the first display device 13 through the communication cable 30. The second display device 14 is a display device for customers, and the third display device 16 is a display device for staffs. The control unit 11 displays the purchase candidate product information on each of the second display device 14 and the third display device 16. In the third example embodiment, the POS terminal device 20 implements the functions of the product purchase support device 10 according to the first example embodiment and includes the second display device 14, which allows the reduction of the number of devices to be installed in a store and also achieves space saving compared with the first and second example embodiments.

Other Example Embodiments

In other example embodiments, the motion detection unit 111 may analyze a captured image in the motion detection range and count the number of times the product selection motion is performed on the same product, and then generate information indicating the quantity of the product specified by a customer as one of the product information on the basis of the number of times the product selection motion is performed. This allows a customer to easily specify the quantity of a product and thereby enhances the convenience of customers when purchasing a product.

Further, in other example embodiments, the motion detection unit 111 may analyze a captured image in the motion detection range and identify the number of fingers of a customer used when selecting a product, and then generate information indicating the quantity of the product specified by the customer as one of the product information on the basis of the number of fingers of the customer. This allows a customer to easily specify the quantity of a product and thereby enhances the convenience of customers when purchasing a product.

Further, in other example embodiments, when a plurality of (e.g., two) customers are located in each area of the areas 1 to 4, whether the product selection motion is performed or not may be determined for each of the customers, and information about each customer may be displayed by partitioning a screen of a display device corresponding to each area.

In the above-described example embodiments, the CPU included in the control unit 11 loads the motion detection unit 111, the feature data generation unit 112, the table processing unit 113, and the display control unit 114, which are program modules, into the RAM and executes them. In other example embodiments, however, those program modules may be implemented in a logic circuit to execute the above-described processing.

In the above-described example, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM, CD-R, CD-R/W, and semiconductor memories (e.g., mask ROM, PROM (Programmable ROM), EPROM (Erasable PROM), flash ROM, RAM, etc.). The program may be provided to a computer using any type of transitory computer readable media. Examples of transitory computer readable media include electric signals, optical signals, and electromagnetic waves. Transitory computer readable media can provide the program to a computer via a wired communication line such as an electric wire and an optical fiber, or a wireless communication line.

The present invention is not limited to the above-described example embodiments and can be modified as appropriate without departing from the spirit and scope of the present disclosure.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-194909 filed on Oct. 16, 2018, the disclosure of which is incorporated herein in its entirety by reference.

REFERENCE SIGNS LIST

10 PRODUCT PURCHASE SUPPORT DEVICE
11 CONTROL UNIT
12 DEPTH CAMERA
13 FIRST DISPLAY DEVICE
14 SECOND DISPLAY DEVICE
15 COMMUNICATION UNIT
20 POS TERMINAL DEVICE
30,40 COMMUNICATION CABLE
100 PRODUCT PURCHASE SUPPORT SYSTEM
200 DISPLAY RACK
300 COUNTER

What is claimed is:

1. A product purchase support system comprising:
a depth camera installed on a display rack of products or installed in close proximity to the display rack, and generates a captured image of an area to be captured and three-dimensional coordinate information of an object included in the captured image;
a product purchase support device including a first display device configured to display information related to a product; and
a POS (Point-Of-Sale) terminal device configured to perform checkout processing for a product, wherein
the product purchase support device includes:
one or more processors; and
a memory storing a program executable by the one or more processors to:
detect a motion of a customer on the basis of the captured image and three-dimensional coordinate information output from the depth camera,
control the first display device, and
perform data communication with the POS terminal device, wherein,
the program is executable by the one or more processors to detect the motion of the customer by identifying the captured image within the detection range of a product selection motion of selecting a product by the customer, identifying a product selected by the customer on the basis of position coordinates of the customer in the identified captured image, and generating product information related to the product selected by the customer,
the program is executable by the one or more processors to control the first display device by displaying the product information on the first display device, and
the program is executable by the one or more processors to perform the data communication with the POS terminal device by outputting the product information to the POS terminal device.

2. The product purchase support system according to claim 1, further comprising:
a second display device configured to be able to receive an instruction from the customer, wherein
the program is executable by the one or more processors to further display the product information on the second display device, and
the program is executable by the one or more processors to further, when the customer instructs purchase of a product by using the second display device, output the product information to the POS terminal device.

3. The product purchase support system according to claim 1, wherein the program is executable by the one or more processors to display the product information of a plurality of customers on different screen areas of the first display device respectively corresponding to positions of the plurality of customers.

4. The product purchase support system according claim 1, wherein the program is executable by the one or more processors to further generate, as one item of the product information, information indicating the quantity of a product specified by the customer on the basis of the number of times the product selection motion is performed on the same product.

5. The product purchase support system according to claim 1, wherein the program is executable by the one or more processors to further generate, as one item of the product information, information indicating the quantity of a product specified by the customer on the basis of the number of fingers of the customer used when selecting a product.

6. A product purchase support device comprising:
a depth camera installed on a display rack of products or installed in close proximity to the display rack, and generates a captured image of an area to be captured and three-dimensional coordinate information of an object included in the captured image;
a display device configured to display information related to a product;
one or more processors;
a memory storing a program executable by the one or more processors to:
detect a motion of a customer on the basis of the captured image and three-dimensional coordinate information output from the depth camera;

control the display device; and perform data communication with an external device, wherein the program is executable by the one or more processors to detect the motion of the customer by identifying the captured image within the detection range of a product selection motion of selecting a product by the customer, identifying a product selected by the customer on the basis of position coordinates of the customer in the identified captured image, and generating product information related to the product selected by the customer, the program is executable by the one or more processors to control the first display device by displaying the product information on the display device, and the program is executable by the one or more processors to perform the data communication with the external device by outputting the product information to the external device.

7. A POS terminal device comprising:

one or more processors;

a memory storing a program executable by the one or more processors to:

detect a motion of a customer on the basis of a captured image of an area to be captured and three-dimensional coordinate information of an object included in the captured image output from a depth camera installed on a display rack of products or installed in close proximity to the display rack;

control a first display device configured to display information related to a product and a second display device configured to be able to receive an instruction from a customer; and perform checkout processing for a product, wherein the program is executable by the one or more processors to detect the motion of the customer by identifying the captured image within the detection range of a product selection motion of selecting a product by the customer, identifying a product selected by the customer on the basis of position coordinates of the customer in the identified captured image, and generating product information related to the product selected by the customer, the program is executable by the one or more processors to control the first display device by displaying the product information on the first display device and the second display device, and the program is executable by the one or more perform to perform the checkout processing for a product on the basis of the product information.

8. The POS terminal device according to claim 7, wherein the second display device is an external device.

9. The POS terminal device according to claim 7, wherein the POS terminal device includes the second display device and a third display device, and the program is executable by the one or more processors to further display the product information on the third display device.

\* \* \* \* \*